Aug. 21, 1928.
T. MULHOLLAND
1,681,247
RUBBER STRIP CUTTING APPARATUS
Filed July 29, 1925
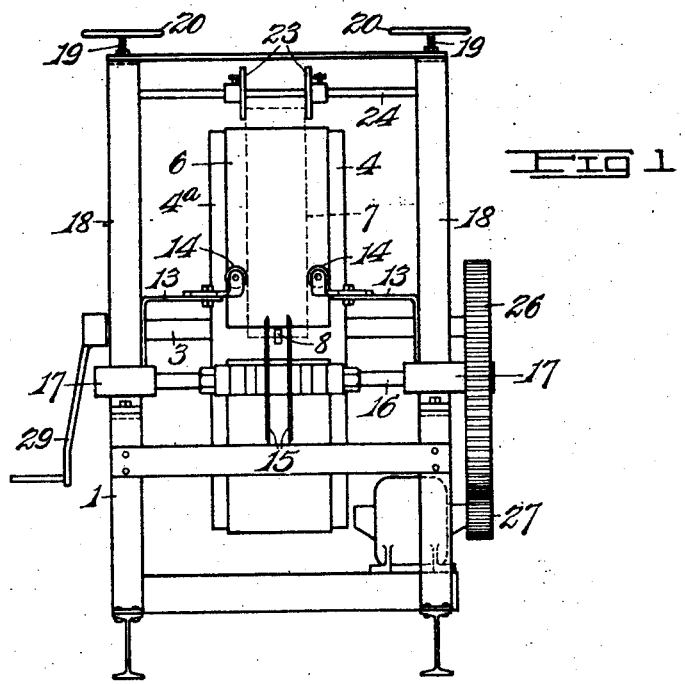
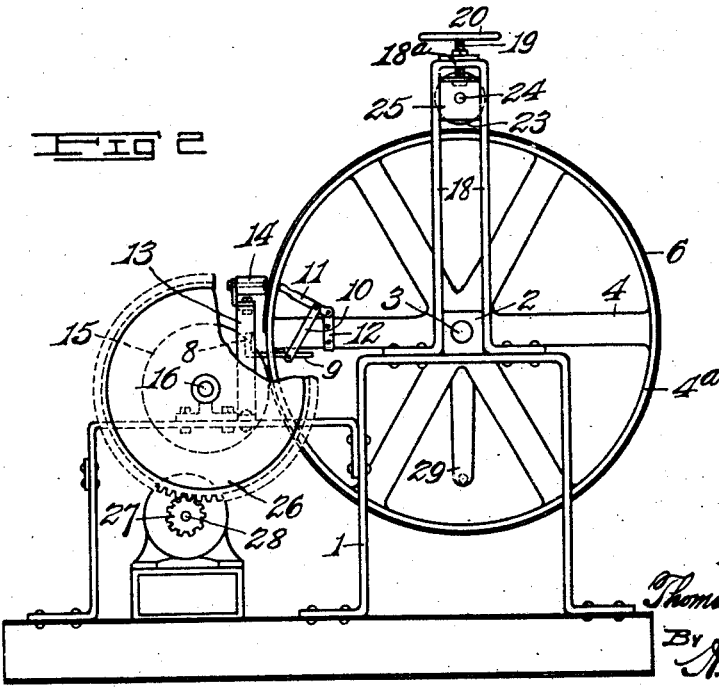
INVENTOR
Thomas Mulholland.
By H. E. Dunlap
ATTORNEY Patented Aug. 21, 1928.

1,681,247

UNITED STATES PATENT OFFICE.

THOMAS MULHOLLAND, OF WHEELING, WEST VIRGINIA, ASSIGNOR, BY DIRECT AND MESNE ASSIGNMENTS, TO VALLEY RUBBER COMPANY, OF WHEELING, WEST VIRGINIA, A CORPORATION OF WEST VIRGINIA.

RUBBER-STRIP-CUTTING APPARATUS.

Application filed July 29, 1925. Serial No. 46,824.

This invention relates broadly to strip cutting apparatus, and it has for its primary object to provide a machine whereby worn or discarded rubber truck-tires or other similar heavy strips of vulcanized rubber may be split or divided annularly into a plurality of long strips as a step preliminary to further separating the rubber of the tire into relatively small sections by cuts made transverse to the lengths of the strips.

In describing the invention in detail, reference is herein had to the accompanying drawings, in which—

Figure 1 is a front end elevation of the invention; and—

Figure 2 is a side elevation of the same, partially broken.

Referring to said drawings, 1 indicates generally a supporting frame on the opposite sides of which are carried bearings 2 in which are journaled the opposite ends of a shaft 3 which has fixed thereon the hub of a wheel 4. Said wheel has a broad flat peripheral rim 4ª upon which is carried a facing 6 of a suitable yielding or soft material, preferably sheet lead, and which is designed to receive thereon, as indicated in dotted lines in Fig. 1, the solid rubber tire 7 which is to be annularly split or divided into strips, said tire being preliminarily severed crosswise to form a single sheet-like length.

The tire so mounted upon the wheel 4 has its forward end firmly clamped in place, as by means of a dog 8. Said dog, as herein shown, is carried on the outer end of a rod or bar 9 which is directed through and movable radially in an opening provided therefor in the peripheral rim 4ª. Pivotally attached to said bar 9 is one end of a link 10 which has its opposite end pivotally attached to a lever 11 intermediate the ends of the latter. Said lever is pivoted at one end to the wheel or to a band 12 carried by one of the spokes of the wheel, as shown. As is obvious, the dog 8 is moved into and out of clamping relation to the mounted tire 7 by manual shifting movements of said lever.

Mounted upon suitable brackets 13 carried by the frame are guide rollers 14 designed for adjustment into bearing engagement with the opposite lateral edges of the tire 7 for maintaining the latter in position on the wheel; and supplementing said rollers are relatively adjustable disks 23 carried by a transverse shaft 24 which has its ends journaled in bearings 25. Said bearings are vertically adjustable in guideways provided therefor between upright parallel members 18 carried by the frame and have swivel connection with and are supported by the lower ends of adjusting screws 19. Said screws are directed vertically through and have threaded engagement with suitable stationary elements, as the horizontal posts 18ª which connect the upper ends of the guide-way forming members 18. By lowering or elevating said screws 19, effected by rotation of hand wheels 20 fixed on the upper ends of said screws, adjustment of said disks 15 into and out of guiding relation to the tire is effected, said disks being designed to ride upon the wheel in engaging relation to the opposite lateral edges of the tire.

Fixed upon a shaft 16 journaled in bearings 17 carried by the frame 1 is a plurality of cutting disks 15 which are adapted to be spaced relatively and with respect to the width of the tire 7 for cutting the latter into strips of the required width or widths. Said disks are so positioned relative to the wheel 4 that the peripheral cutting edges thereof operate closely against the sheet-lead wheel-facing 6.

The disk-carrying shaft 16 is preferably motor driven, having a gear wheel 26 fixed thereon operatively associated with a drive pinion 27 carried by the rotor shaft 28 of a suitably located electric motor.

In practice, following mounting of the tire on the carrying wheel 4, the latter is slowly rotated forward for presenting the tire in the paths of rotation of the rapidly rotated cutting disks 15 whereby said tire is divided throughout its length into a plurality of strips of even narrow width.

A hand crank 29 mounted on the wheel carrying shaft 3 provides means whereby the latter may be rotated manually.

As is obvious, the soft facing 6 carried by the wheel is designed to permit the cutting disks 15 to be adjusted for cutting wholly through the tire without injury to their cutting edges.

What is claimed is—

1. A machine for strip-cutting discarded solid rubber tires, comprising a carrying wheel, means for clamping a tire on the rim of said wheel, rotatable guides engageable with the edges of the tire, and a revoluble cutting disk arranged adjacent to said wheel and in facing relation to said rim and adapted to slit annularly a tire carried by said wheel as the latter is rotated.

2. A machine for strip-cutting discarded solid rubber tires, comprising a carrying wheel, means for clamping upon the rim of said wheel an end of a transversely severed tire, rotatable tire-guiding means engageable with the lateral edges of the tire, a plurality of relatively adjustable revoluble cutting disks disposed in the path of rotary movement of the tire carried by said wheel, and means for rotating said wheel relative to said disks.

3. A machine for strip-cutting discarded solid rubber tires, comprising a rotary carrying wheel, means for clamping upon the rim of said wheel an end of a transversely severed tire, rollers adjustable into guiding relation to said tire, a plurality of adjustable cutting disks revolubly mounted in positions in which their peripheral edges operate in the path of rotary movement of the tire carried by said rim, and means for rotating said disks.

4. A machine for strip-cutting discarded solid rubber tires, comprising a carrying wheel having a facing of soft material, means for securing upon said facing a transversely severed tire, and a plurality of cutting disks revolubly mounted adjacent to said wheel rim and adapted to act against said facing for slitting said tire lengthwise as said wheel is rotated for presenting said tire thereto.

In testimony whereof, I affix my signature.

THOMAS MULHOLLAND.